United States Patent
Coninx et al.

(10) Patent No.: US 9,649,788 B2
(45) Date of Patent: May 16, 2017

(54) METHOD OF FABRICATING AN ARRAY OF OPTICAL LENS ELEMENTS

(71) Applicant: Anteryon Wafer Optics B.V., Eindhoven (NL)

(72) Inventors: Robertus Johannes Gerardus Coninx, Eindhoven (NL); Willem Matthijs Brouwer, Eindhoven (NL); Edwin Maria Wolterink, Eindhoven (NL)

(73) Assignee: Anteryon Wafer Optics B.V., Eindhoven (NL)

( * ) Notice: Subject to any disclaimer, the term of this patent is extended or adjusted under 35 U.S.C. 154(b) by 0 days.

(21) Appl. No.: 14/995,812

(22) Filed: Jan. 14, 2016

(65) Prior Publication Data
US 2017/0050347 A1    Feb. 23, 2017

(51) Int. Cl.
| | |
|---|---|
| *B29D 11/00* | (2006.01) |
| *B29C 39/14* | (2006.01) |
| *B29C 39/02* | (2006.01) |
| *G02B 3/00* | (2006.01) |
| *B29L 11/00* | (2006.01) |

(52) U.S. Cl.
CPC .......... *B29C 39/146* (2013.01); *B29C 39/025* (2013.01); *B29D 11/00298* (2013.01); *G02B 3/0031* (2013.01); *B29L 2011/0016* (2013.01)

(58) Field of Classification Search
CPC ............ B29D 11/00298; B29C 39/146; B29C 35/025; B29L 2011/0016; G02B 3/0031
See application file for complete search history.

(56) References Cited

U.S. PATENT DOCUMENTS

| | | | |
|---|---|---|---|
| 3,532,038 A | 10/1970 | Rottmann | |
| 4,756,972 A | 7/1988 | Kloosterboer et al. | |
| 4,890,905 A | 1/1990 | Van Rosmalen et al. | |
| 7,771,630 B2 * | 8/2010 | Hartmann | B29D 11/00365 216/26 |
| 2004/0100700 A1 | 5/2004 | Kitamura et al. | |
| 2006/0262410 A1 | 11/2006 | Toyoda | |

(Continued)

FOREIGN PATENT DOCUMENTS

| | | |
|---|---|---|
| EP | 1837165 A1 | 9/2007 |
| JP | 2008162040 | 7/2008 |

(Continued)

OTHER PUBLICATIONS

International Search Report and Written Opinion dated Nov. 9, 2016.

*Primary Examiner* — Mathieu Vargot
(74) *Attorney, Agent, or Firm* — Wood, Phillips, Katz, Clark & Mortimer (57) ABSTRACT

The present invention relates to a method of fabricating an array of optical lens elements, comprising:
providing a first mold having a plurality of recesses;
applying a first polymer liquid in said plurality of recesses;
providing a first contact shaping substrate;
contacting said first contact shaping substrate with said first polymer liquid in said plurality of recesses, wherein said contact between said first contact shaping substrate and said first polymer liquid results in a deformation of the contour configuration of said first polymer liquid facing away from said plurality of recesses;
curing said first polymer liquid to form an array of optical lens elements.

15 Claims, 9 Drawing Sheets

(56) References Cited

U.S. PATENT DOCUMENTS

| | | |
|---|---|---|
| 2008/0054507 A1 | 3/2008 | Rudmann et al. |
| 2009/0022949 A1 | 1/2009 | Horita et al. |
| 2009/0034088 A1 | 2/2009 | Delaney et al. |
| 2012/0200943 A1 | 8/2012 | Gallagher et al. |
| 2014/0002902 A1* | 1/2014 | Rudmann ............... G02B 7/02 359/503 |
| 2015/0168666 A1 | 6/2015 | Brouwer et al. |

FOREIGN PATENT DOCUMENTS

| | | |
|---|---|---|
| WO | 03069740 A2 | 8/2003 |
| WO | 2010050290 A1 | 5/2010 |
| WO | 2012100356 A1 | 8/2012 |
| WO | 2014092148 A1 | 6/2014 |
| WO | 2015093945 A1 | 6/2015 |
| WO | 2015122769 A1 | 8/2015 |

\* cited by examiner

METHOD OF FABRICATING AN ARRAY OF OPTICAL LENS ELEMENTS

TECHNICAL FIELD

The present invention relates to a method of fabricating an array of optical lens elements.

BACKGROUND OF THE INVENTION

From U.S. Pat. No. 3,532,038 there is known an optical system in which a transparent base member is provided with lenticular lens cavities, which cavities are filled with a refractive fluid, the surface of which fluid is covered with a cover member. The cover member is provided with an aperture plate, on which finally a second base member is present, which is also provided with lenticular lens cavities, which cavities are likewise filled with a refractive fluid.

From US 2004/0100700 there is known a method of manufacturing a micro lens array, wherein the cavities in a mould are filled with a UV curable resin, whilst the resin outside the cavities is removed by placing a transparent quartz board on top of the mould. The fluid present in the cavities is then formed into a plurality of separate lenses, whereupon a second UV curable resin layer is applied to the transparent board, which resin layer is cured by making use of the already formed separate lenses. The excess amount of the cured second resin layer is removed by using an organic solvent. Only one layer of replicated lenses is mentioned in said document, which lenses are separately arranged and do not exhibit any interconnection.

The replication process is known per se from U.S. Pat. Nos. 4,756,972 and 4,890,905, which disclose the possibility of manufacturing a high-quality optical component by means of a replication process. Such a replication process is considered to be a quick and inexpensive manner of manufacturing optical components in large numbers. In the replication process, a mould having a precisely defined surface, for example an aspherical surface, is used, and a small amount of a radiation curable resin, for example a UV curable resin, is applied to the mould surface. Subsequently, the resin is spread over the mould surface, so that the cavities in the mould are filled with the resin, after which the whole is irradiated so as to cure the resin and the thus cured product is removed from the mould. The cured product is a negative of the mould surface. An advantage of the replication process is that lenses having a complex refractive surface, such as an aspherical surface, can be manufactured in a simple manner without having to subject the lens body to intricate grinding and polishing processes.

From International application WO 03/069740 in the name of the present applicant there is also known a replication process by which an optical element is formed.

WO 2012100356 relates to a method for manufacturing a plurality of optical devices, comprising the steps of: providing a replication tool, the replication tool comprising a replication surface defining an array of replication cells, each replication cell comprising a lens replication portion and a spacer replication portion, bringing the replication tool and a support in contact with each other with replication material between the replication surface and the support; causing the replication material to harden, wherein, during the step of causing the replication material to harden, the lens replication sections are caused to be kept at a distance from the support.

US 2009022949 relates to a process for producing a functional-element-mounted module, comprising the steps of disposing a substrate having mounted thereon a functional element having a mounting portion and a resin sealing plate formed therein with an opening corresponding in position to the functional portion of the functional element as opposed to each other at a predetermined distance; and impregnating and filling a sealing resin between the substrate and the resin sealing plate utilizing a capillary phenomenon.

WO 2015093945 in the name of the present applicant relates to a method of fabricating a wafer level optical lens assembly, comprising: providing a first wafer substrate having a plurality of bumps; applying a first polymer liquid on a first contact optical surface of said plurality of bumps; providing a second wafer substrate; contacting said first wafer substrate with said second substrate in such that said first polymer liquid is located in a slit created between said first contact optical surface of said plurality of bumps and said second wafer substrate under capillary forces; curing said polymer liquid(s) to form a lens.

US 2009034088 relates to a method of making a micro-optical device, comprising: providing a replication material between a support substrate and a master substrate having structural features for forming a micro-optical lens, the replication material covering at least a portion of an opaque material on the support substrate; applying pressure to at least one of the support substrate and the master substrate; curing the replication material to form a replica including the micro-optical lens; and removing the support substrate including the opaque material and the replica.

US 2012200943 relates to a method of forming a lens, comprising: molding a pre-final lens using a first master, using a second master to form a top layer atop the pre-final lens, wherein the pre-final lens includes a deformity due to shrinkage of the pre-final lens after molding the pre-final lens, and wherein the top layer substantially corrects the deformity, wherein the pre-final lens forms a majority of a final volume of the lens.

WO 2014092148 relates to a method for manufacturing a lens array structure, whereby an adhesive is applied between first lens elements formed on a lens array and pushing out of the adhesive applied on the periphery of the outside lens elements to the surroundings can be limited.

EP 1 837 165 relates to a method of manufacturing an element by means of a replication tool, comprising the steps of providing a replication tool that defines the shape of the element; providing a substrate; pressing the replication tool against the substrate, with a replication material in a liquid or viscous or plastically deformable state located between the tool and the substrate; confining the replication material to a predetermined area of the substrate, which predetermined area exceeds the desired area of the element on the substrate, in at least one direction along the surface of the substrate by less than a predetermined distance; hardening the replication material to form the element.

From the above state of the art there are thus known methods by which optical systems are obtained which are made up of separately manufactured optical elements, as a result of which the dimensions of such systems may be considered to be large. In addition, the positional accuracy, viz. in the X, Y and Z directions (between the lens surfaces) of such systems may be called critical.

Current controlled contour shapes of optical elements are determined by mold shapes. Toolings for these complex shapes are expensive. Mold surfaces for only optical surfaces need to be very accurately shaped (typical $\lambda/40$ or better). Peripheral structures require far lower shape accuracies of at least 100 times lower.

SUMMARY OF THE INVENTION

An aspect of the present invention is to provide a method of fabricating an array of optical lens elements by means of a replication process in which contour shapes of optical elements can be controlled in an accurate manner.

The present invention thus relates to a method of fabricating an array of optical lens elements, comprising:
 providing a first mold having a plurality of recesses;
 applying a first polymer liquid in said plurality of recesses;
 providing a first contact shaping substrate;
 contacting said first contact shaping substrate with said first polymer liquid in said plurality of recesses, wherein said contact between said first contact shaping substrate and said first polymer liquid results in a deformation of the contour configuration of said first polymer liquid facing away from said plurality of recesses;
 curing said first polymer liquid to form an array of optical lens elements.

The present inventors found that by applying such a method the contour shapes of optical elements can be controlled in an accurate manner. In this embodiment the first polymer liquid is pressed by the first contact shaping substrate into the plurality of recesses such that a part of the first polymer liquid will flow out these pluralities of recesses into the direction of the surface of the first mold. This will be the surface directly surrounding the plurality of recesses. By maintaining the first contact shaping substrate in contact with the first polymer liquid during the step of curing an array of optical lens elements having well defined contour shapes is obtained. Thus, the first polymer liquid is positioned, i.e. confined, between the first contact shaping substrate and the first mold having a plurality of recesses. The array of optical lens elements thus obtained comprises one single cured polymer, namely the cured first polymer.

The method of fabricating an array of optical lens elements as discussed above preferably comprises, after curing said first polymer liquid, a step of removing said first mold.

In another preferred embodiment the present method of fabricating an array of optical lens elements further comprises, after curing said first polymer liquid,
 a step of removing said first contact shaping substrate from said array of optical lens elements;
 a step of providing a second polymer liquid onto said an array of optical lens elements;
 curing said second polymer liquid.

In such an embodiment according to the invention the present method can be identified as a two step replication process comprising, in a first step, the manufacturing of a preform structure and, in a second step, the replication of a second layer upon the cured preform to provide the final shape. The present inventors found that current processes for manufacturing optical elements are not accurate enough because of too large variations in vertexes of the preform and post filling part of the optical element. The array of optical lens elements thus obtained comprises a combination of two cured polymers, namely the cured first polymer and the cured second polymer.

In another preferred embodiment the present method of fabricating an array of optical lens elements further comprises, after providing said second polymer liquid onto said array of optical lens elements:

a step of providing a second contact shaping substrate;
 a step of contacting said second contact shaping substrate with said second polymer liquid, wherein said contact between said second contact shaping substrate and said second polymer liquid results in a complete coverage of the contour configuration of said array of optical lens elements facing away from said first mold having a plurality of recesses;
 curing said second polymer liquid.

In this embodiment the second polymer liquid is pressed by the second contact shaping substrate into the direction of the array of optical lens elements such that the second polymer liquid will distribute across the contours of the array of optical lens elements. By maintaining the second contact shaping substrate in contact with the second polymer liquid during the step of curing an array of optical lens elements having well defined contour shapes is obtained. Thus, the second polymer liquid is positioned, i.e. confined, between the second contact shaping substrate and the first mold. The array of optical lens elements thus obtained comprises a combination of two cured polymers, namely the cured first polymer and the cured second polymer.

The method of fabricating an array of optical lens elements as discussed above preferably comprises, after curing said second polymer liquid,
 a step of removing said first mold.

The present inventors found that in a preferred embodiment the first contact shaping substrate is provided with a flow stop pattern acting as a flow stop for said first polymer liquid upon contacting said first contact shaping substrate with said first polymer liquid.

It is also preferred that the second contact shaping substrate is provided with a flow stop pattern acting as a flow stop for said second polymer liquid upon contacting said second contact shaping substrate with said second polymer liquid.

The flow stop pattern preferably comprises a layer of submicron thickness.

According to another preferred embodiment the flow stop pattern comprises a surface area having a surface energy being different than said first and/or second contact shaping substrate.

In a preferred embodiment of the present method of fabricating an array of optical lens elements the first mold having a plurality of recesses has a specific construction, namely at least some of said plurality of recesses is provided with a peripheral portion. Control of vertexes of preform resulting from prefill process and total lens shape is improved using a specific mold design with such a peripheral buffer zone. Resin flow may further be controlled by local surface geometries such as peripheral flow buffer zones and flow stops/retarders on mold and/or shaping substrates and/or lens.

It is preferred when the first contact shaping substrate is configured as a flat substrate.

It is preferred when the second contact shaping substrate is configured as a flat substrate.

According to a preferred embodiment of the method of fabricating an array of optical lens elements the surface energy of the contact surface of said second contact shaping substrate is such that said complete coverage of the contour configuration results in a lateral curvature shape.

A preferred lateral curvature shape is a half moon shape.

Another preferred lateral curvature shape is a bell clock curve shape.

BRIEF DESCRIPTION OF THE DRAWINGS

The present invention will be discussed with reference to the figures.

FIGS. 3A-3H show another embodiment of a second phase of the method of fabricating an array of optical lens elements.

DETAILED DESCRIPTION

FIG. 1 shows in FIG. 1 A-F a first phase of the method of fabricating an array of optical lens elements. A first mold 1 having a plurality of recesses 3 is provided wherein a first polymer liquid 2 is applied in the plurality of recesses 3 (see FIG. 1A). According to FIG. 1B a first contact shaping substrate 5 is provided and first contact shaping substrate 5 is contacted with first polymer liquid 2 present in plurality of recesses 3. By this contact the first polymer liquid 2 will be pressed into the plurality of recesses 3 and will partly flow out the plurality of recesses and cover some area of the surface of first mold 1. This contact between first contact shaping substrate 5 and first polymer liquid 2 results thus in a deformation of the contour configuration of first polymer liquid 2 facing away from the plurality of recesses 3. In FIG. 1C the position of first contact shaping substrate 5 is maintained during the curing step, wherein first polymer liquid 2 is cured by energy 4 to form a plurality of replicated lenses 6. In case first contact shaping substrate 5 is removed (as shown in FIG. 1D) the surface 7 of replicated lenses 6 is deformed. In FIG. 1E first polymer liquid is cured by energy 4 to form a plurality of replicated lenses 6. In FIG. 1E no first contact shaping substrate 5 has been used during the step of curing. In FIG. 1E there is no deformation of the surface of replicated lenses 6. In FIGS. 1G and 1H an array of optical lens elements 6 is shown after removal of first mold 1. The array of optical lens elements 6 comprises one single polymer, i.e. cured first polymer and first contact shaping substrate 5. A shown in both FIGS. 1G and 1H parts 63 of the surface of first contact shaping substrate 5 have not been provided with cured polymer. The contour shape 64 (see FIG. 1G) and contour shape 60 (see FIG. 1H) are influenced by the surface tension of first contact shaping substrate 5, wherein the surface of first contact shaping substrate 5 has been identified by reference number 63. Surface part 61 is the result of the step of contacting first contact shaping substrate 5 with the first polymer liquid 2 before curing (see FIG. 1B). The contour diameter of each lens element is determined by, inter alia, the amount of the first polymer liquid, and the distance between the contact shaping substrate and the mold and the local surface tension. The shape of contour 62 is determined by the shape of the plurality of recesses 3 in first mold 1.

Figures 2A, 2B:
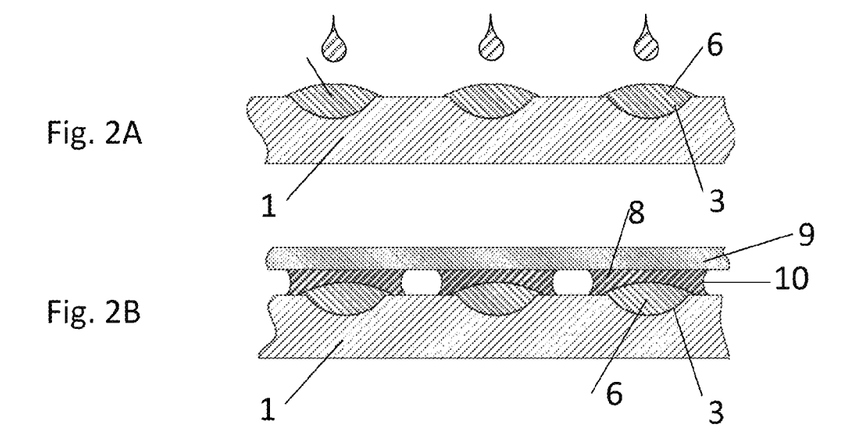
FIGS. 2A-2D show a second phase of the method of fabricating an array of optical lens elements.
Figure 2C:
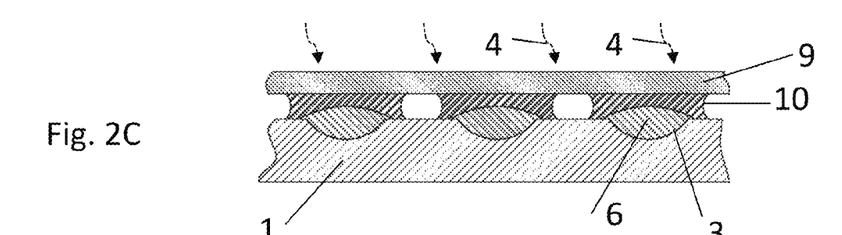
Figure 2D:
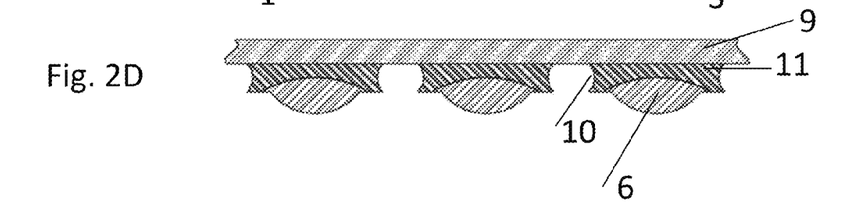

FIG. 2 shows in FIG. 2 A-D a second phase of the method of fabricating an array of optical lens elements. First mold 1 having a plurality of recesses 3 is provided with replicated lenses 6 therein. A second polymer liquid 8 is provided onto the plurality of replicated lenses 6 in FIG. 2 A. According to FIG. 2B a second contact shaping substrate 9 is provided and second contact shaping substrate 9 is contacted with replicated lenses 6 present in plurality of recesses 3. This second polymer liquid 8 covers replicated lenses 6 completely as shown in FIG. 2B. The peripheral contour of second polymer liquid 8 is indicated with reference number 10. In FIG. 2C second polymer liquid 8 is cured by energy 4. In FIG. 2D a step of removing first mold 1 after curing the second polymer liquid for obtaining said array of optical lens elements is shown, comprising second contact shaping substrate 9 provided wit cured second polymer 11 and replicated lenses 6.

Figures 1A, 1B, 1C, 1D:
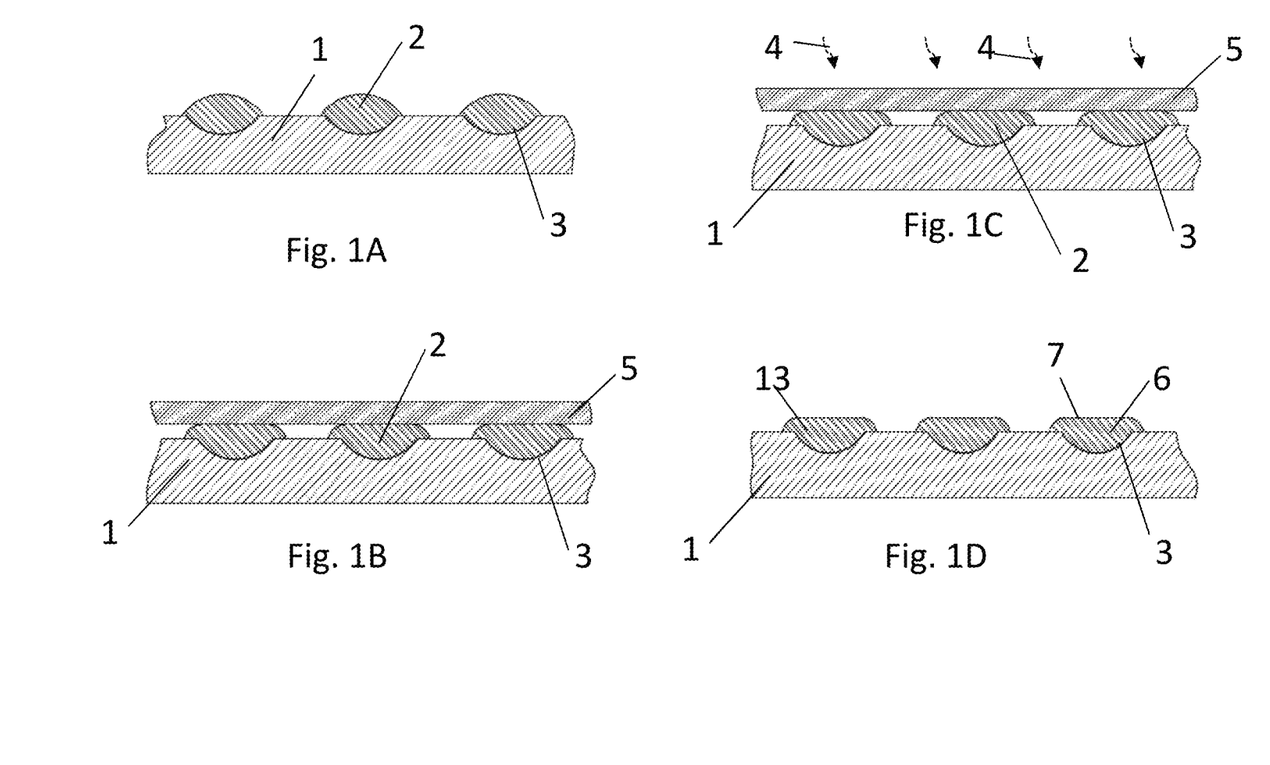
FIGS. 1A-1G show a first phase of the method of fabricating an array of optical lens elements.
Figure 1E:
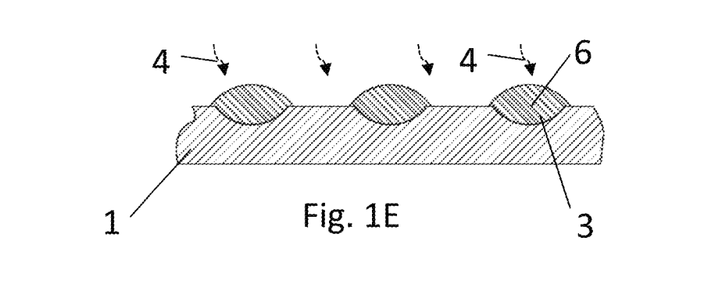
Figure 1F:
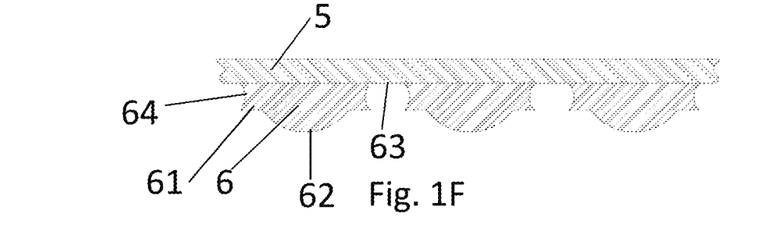
Figure 1G:
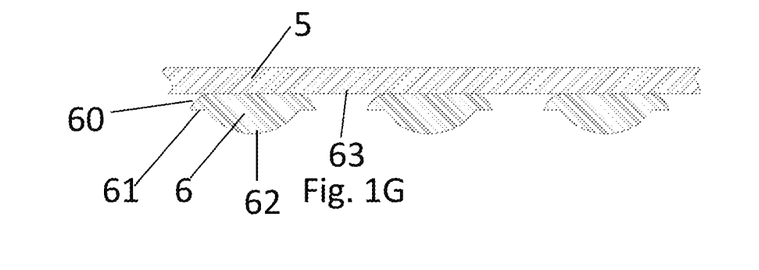

FIG. 3 shows another embodiment of a second phase of the method of fabricating an array of optical lens elements, starting with the construction as shown in FIG. 1D. In FIG. 3A first mold 1 having a plurality of recesses 3 is provided with replicated lenses 6 therein. A second polymer liquid 8 is provided onto the deformed surface 7 of the plurality of replicated lenses 6 in FIG. 3 A. According to FIG. 3B a second contact shaping substrate 12 is provided and second contact shaping substrate 12 is contacted with the second polymer liquid 8 located on the replicated lenses 6 present in plurality of recesses 3. This second polymer liquid 8 covers replicated lenses 6 completely as shown in FIG. 3B. The peripheral contour of second polymer liquid 8 is indicated with reference number 14. In FIG. 3C second polymer liquid 8 is cured by energy 4. In FIG. 3D a step of removing first mold 1 after curing the second polymer liquid 8 for obtaining said array of optical lens elements is shown, comprising second contact shaping substrate 12 provided with cured second polymer and replicated lenses 6. FIG. 3D also shows the peripheral contour 14 of cured second polymer, the post fill interface 15, 16. FIG. 3F shows an embodiment similar to FIG. 3D but with different peripheral contour 17. This different peripheral contour can be achieved with different surface energy on mold surface. FIG. 3G shows a lateral curvature shape 14 as a half moon shape. FIG. 3H shows a lateral curvature shape 17 as a bell clock curve shape. Reference number 13 is a clear aperture edge, reference number 15, 18 is a lateral rim.

Figure 3A:
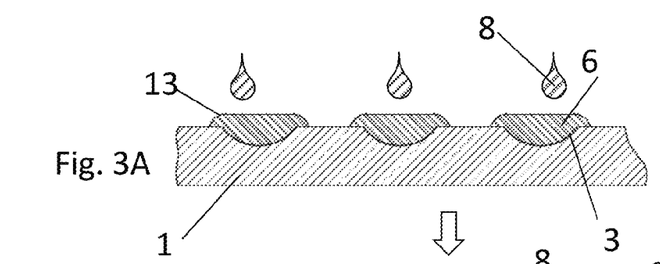
Figure 3B:
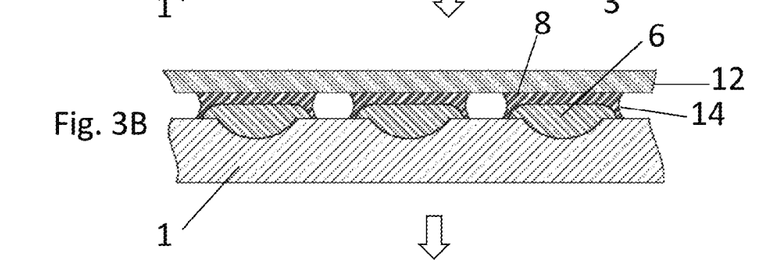
Figure 3C:
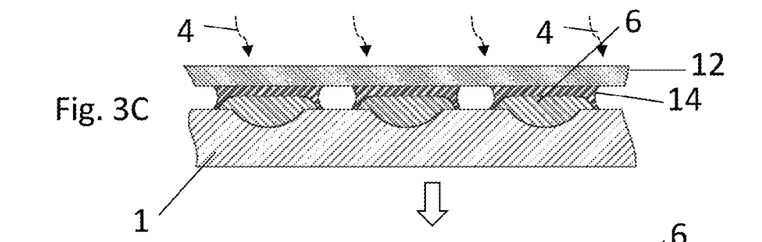
Figure 3D:
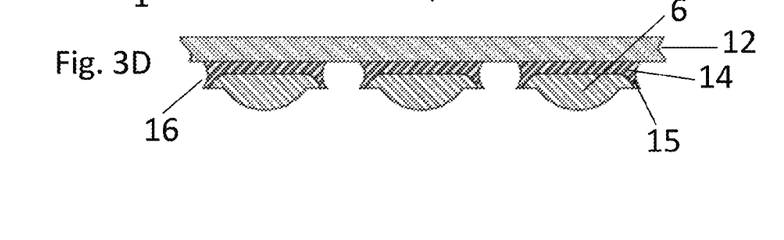
Figure 3F:
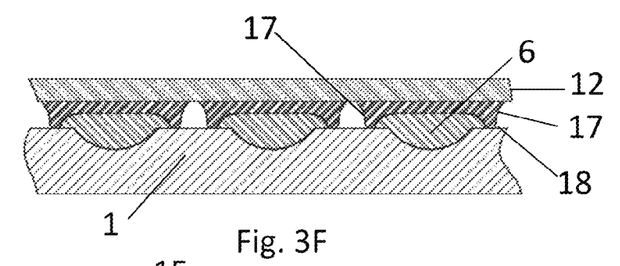
Figure 3G:
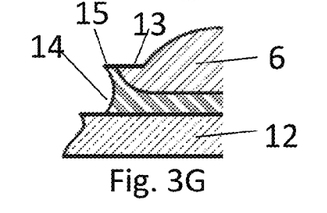
Figure 3H:
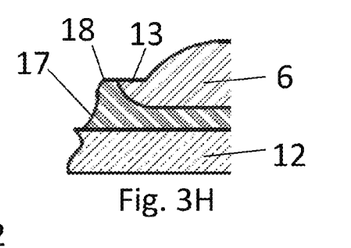
Figure 4A:
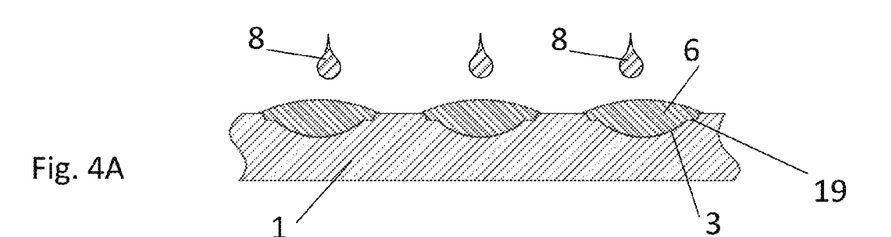
FIGS. 4A-4D show another embodiment of a second phase of the method of fabricating an array of optical lens elements.
Figure 4B:
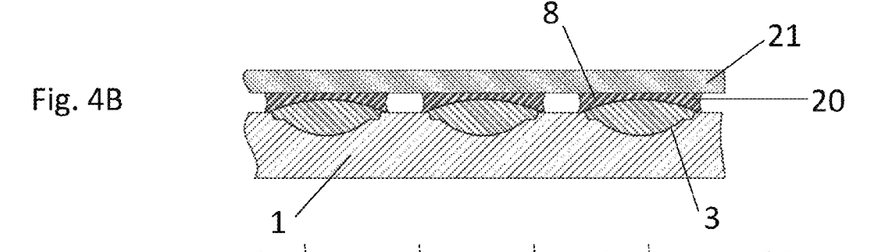
Figures 4C, 4D:
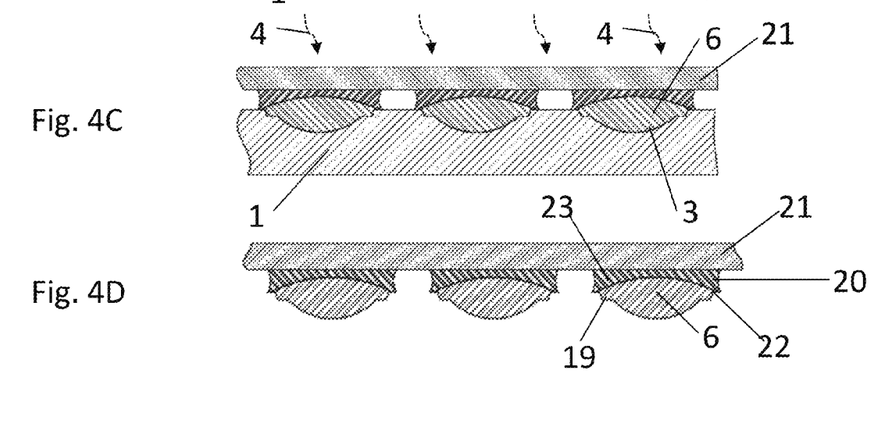
Figure 5A:
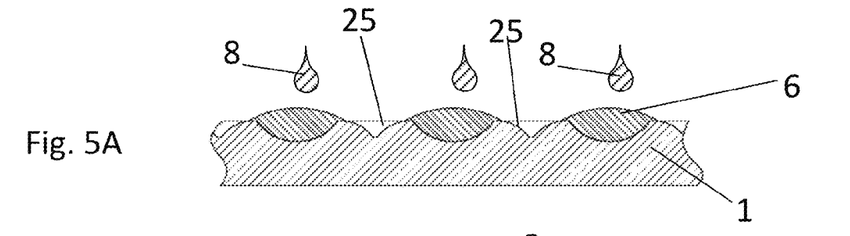
FIGS. 5A-5D show another embodiment of a second phase of the method of fabricating an array of optical lens elements.
Figure 5B:
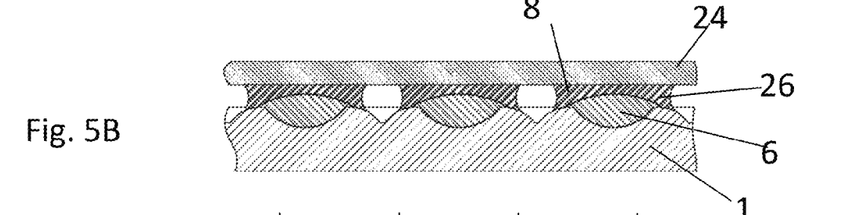
Figure 5C:
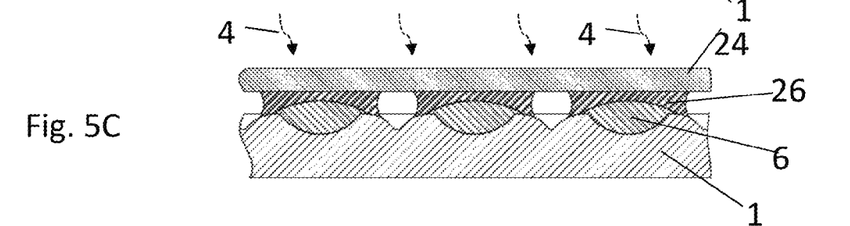
Figure 5D:
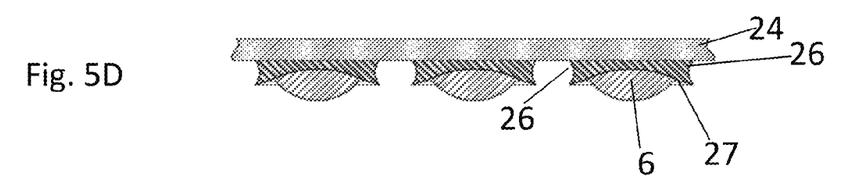

FIG. 4 shows another embodiment of a second phase of the method of fabricating an array of optical lens elements. In FIG. 4A first mold 1 having a plurality of recesses 3 is provided with replicated lenses 6 therein. The lens surface of lens 6 has a shape peripheral portion 19, buffer zone. A second polymer liquid 8 is provided onto the surface of the plurality of replicated lenses 6 in FIG. 4 A. According to FIG. 4B a second contact shaping substrate 21 is provided and second contact shaping substrate 21 is contacted with the second polymer liquid 8 located on the replicated lenses 6 present in plurality of recesses 3. This second polymer liquid 8 covers replicated lenses 6 completely as shown in FIG. 4B. The peripheral contour of second polymer liquid 8 is indicated with reference number 20. In FIG. 4C second polymer liquid 8 is cured by energy 4. In FIG. 4D a step of removing first mold 1 after curing the second polymer liquid 8 for obtaining said array of optical lens elements is shown, comprising second contact shaping substrate 21 provided with cured second polymer and replicated lenses 6. FIG. 3D also shows the peripheral contour 20, 23 of cured second polymer, the post fill interface 19, 22. FIG. 3D shows a lateral curvature shape 20, 23 as a half moon shape.

FIG. 5 shows another embodiment of a second phase of the method of fabricating an array of optical lens elements. In FIG. 5A first mold 1 having a plurality of recesses 3 is provided with replicated lenses 6 therein. First mold 1 is provided with additional curvatures or slopes 25 between lenses 6. A second polymer liquid 8 is provided onto the surface of the plurality of replicated lenses 6 in FIG. 5A. According to FIG. 5B a second contact shaping substrate 24 is provided and second contact shaping substrate 24 is contacted with the second polymer liquid 8 located on the replicated lenses 6 present in plurality of recesses 3. This second polymer liquid 8 covers replicated lenses 6 completely as shown in FIG. 5B. The peripheral contour of second polymer liquid 8 is indicated with reference number 26. In FIG. 5C second polymer liquid 8 is cured by energy 4. In FIG. 5D a step of removing first mold 1 after curing the second polymer liquid 8 for obtaining said array of optical lens elements is shown, comprising second contact shaping substrate 24 provided with cured second polymer and replicated lenses 6.

Figure 6A:
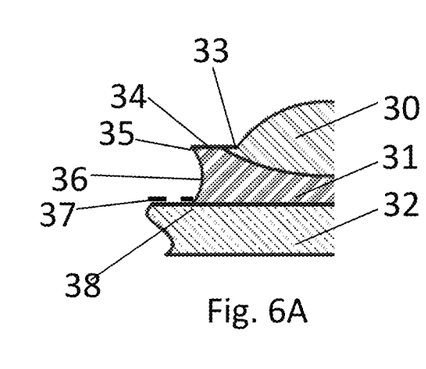
FIGS. 6A-6E show different contour variations of a lateral curvature shape.
Figure 6B:
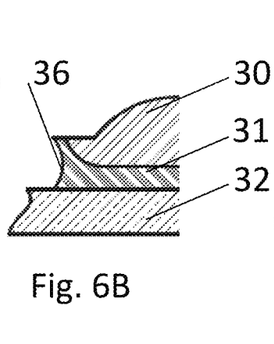
Figure 6C:
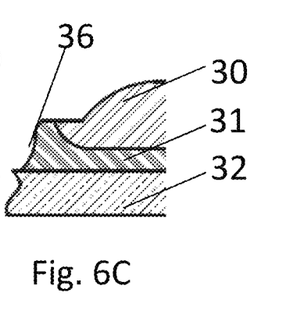
Figure 6D:
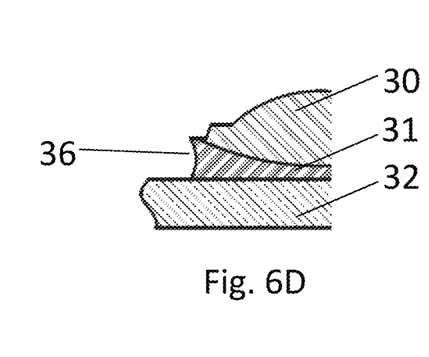
Figure 6E:
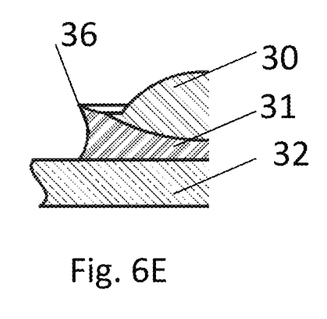
Figure 7A:
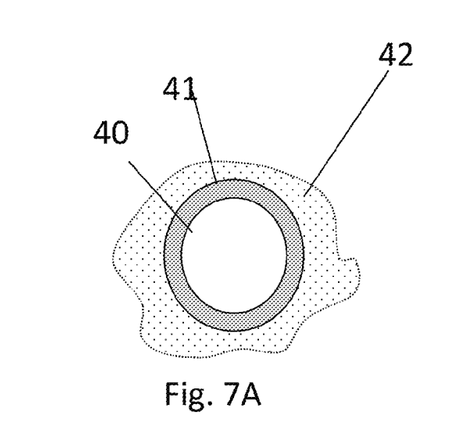
FIGS. 7A-7F show different embodiments of a flow stop zone.
Figure 7B:
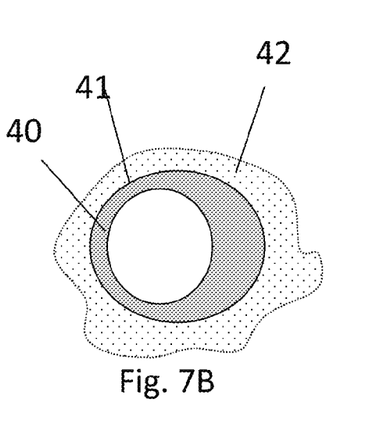
Figure 7C:
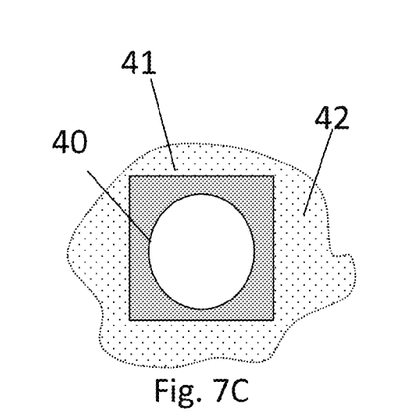
Figure 7D:
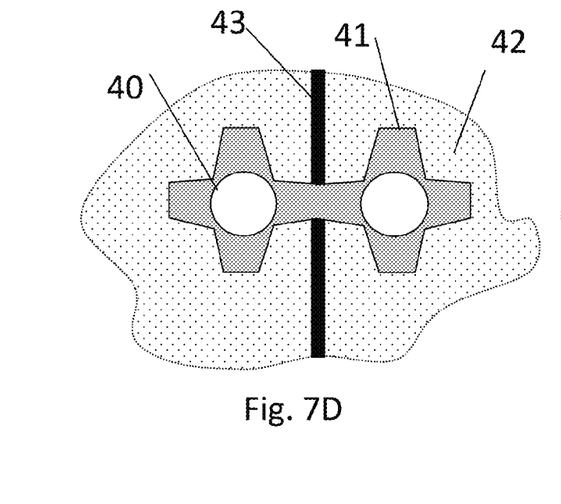
Figure 7E:
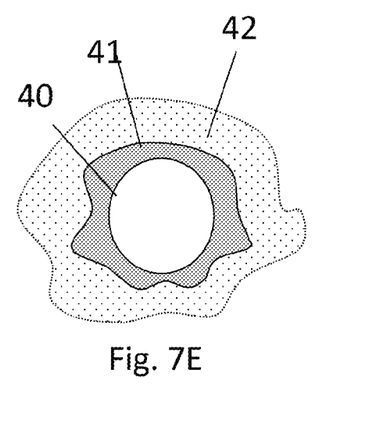
Figure 7F:
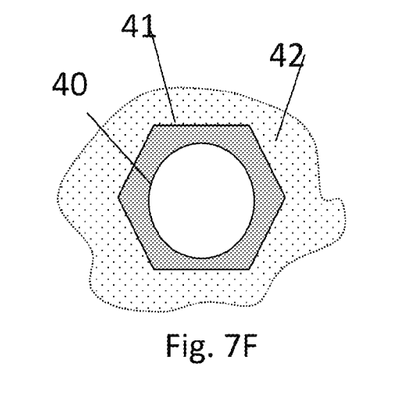

FIG. 6A-F shows different contour variations of a lateral curvature shapes. In FIG. 6A lens substrate 32 is provided with cured polymer 31, wherein cured polymer 31 is provided with cured polymer 30. Cured polymer 31 covers cured polymer 30 completely. FIG. 6A further shows a flow stop zone 37, a lateral curvature shape 36, a lateral rim 35, post fill interface 34, clear aperture edge 33. All optical elements shown in FIG. 6A-6F have at least two contiguous resin material zones 30, 31 where the prefill/postfill interface 34 between the zones is positioned between the clear aperture edge 33 and outer edge 38 interfacing lens substrate 32. Shapes of lateral curvature 36 and lateral rim 35 are determined by local differences of surface tensions between the mold (not shown here) and lens substrate 32. Outer edge contours are determined by shape of flow stop zone 37. FIGS. 6A, 6B, 6D and 6E show a lateral curvature shape 36 as a half moon shape. FIG. 6C shows a lateral curvature shape 36 as a bell clock curve shape.

FIG. 7 shows in FIG. 7A-7F different embodiments of a flow stop zone. Outer edge 41 contour is determined by shape of a thin flow 'stop' layer 42 or pattern with a different surface energy/wettability acting as a flow stop for the liquid resin. Thickness of stop layer 42 is in the range of submicron down to molecular monolayer. Stop layer 42 may have any shape or pattern according to design. Contour of lens (clear aperture edge 40) is circular here but may have also any other shape (elliptical, cylindrical, truncated, connected.) according to optical design.

Figure 8:
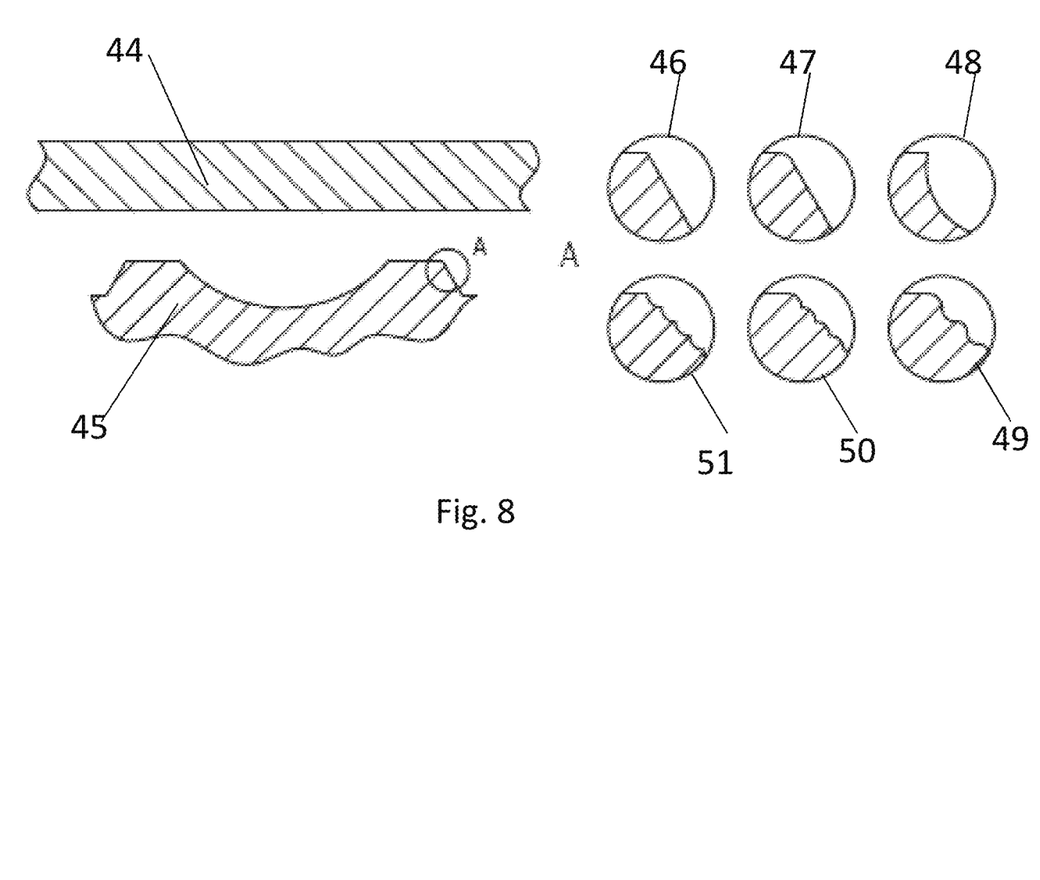
FIG. 8 shows different embodiments of features controlling resin flow.

FIG. 8 shows different embodiments of features 46, 47, 48, 49, 50, 51 for controlling resin flow. Patterns with locally modified surface tensions on molds and/or shaping substrates and/or lens substrates. Local modification can be chemical, by plasma (using masks), by laser or by applying thin films with specific surface tension. Patterns may be permanent and may have optical functions such as diaphragms or filters. Substrates are indicated by reference number 44, molds by reference number 45.

What is claimed is:

1. A method of fabricating an array of optical lens elements, comprising:
   providing a first mold having a plurality of recesses;
   applying a first polymer liquid in said plurality of recesses;
   providing a first contact shaping substrate;
   contacting said first contact shaping substrate with said first polymer liquid in said plurality of recesses, wherein said contact between said first contact shaping substrate and said first polymer liquid results in a deformation of the contour configuration of said first polymer liquid facing away from said plurality of recesses;
   curing said first polymer liquid to form an array of optical lens elements; and
   further comprising, after curing said first polymer liquid,
      a step of removing said first contact shaping substrate from said array of optical lens elements;
      a step of providing a second polymer liquid onto said an array of optical lens elements;
   further comprising, after providing said second polymer liquid onto said array of optical lens elements:
      a step of providing a second contact shaping substrate;
      a step of contacting said second contact shaping substrate with said second polymer liquid wherein said contact between said second contact shaping substrate and said second polymer liquid results in a complete coverage of the contour configuration of said array of optical lens elements facing away from said first mold having a plurality of recesses;
      curing said second polymer liquid;
   wherein first contact shaping substrate is configured as a flat substrate.

2. A method of fabricating an array of optical lens elements according to claim 1, further comprising, after curing said first polymer liquid,
   a step of removing said first mold.

3. A method of fabricating an array of optical lens elements according to claim 1, further comprising, after curing said second polymer liquid,
   a step of removing said first mold.

4. A method of fabricating an array of optical lens elements according to claim 1, wherein in said first mold having a plurality of recesses at least some of said plurality of recesses is provided with a peripheral portion.

5. A method of fabricating an array of optical lens elements according to claim 1 wherein said first contact shaping substrate is provided with a flow stop pattern acting as a flow stop for said first polymer liquid upon contacting said first contact shaping substrate with said first polymer liquid.

6. A method of fabricating an array of optical lens elements according to claim 5, wherein said flow stop pattern comprises a layer of submicron thickness.

7. A method of fabricating an array of optical lens elements according to claim 5, wherein said flow stop pattern comprises a surface area having a surface energy being different than said first and/or second contact shaping substrate.

8. A method of fabricating an array of optical lens elements according to claim 1, wherein said second contact shaping substrate is provided with a flow stop pattern acting as a flow stop for said second polymer liquid upon contacting said second contact shaping substrate with said second polymer liquid.

9. A method of fabricating an array of optical lens elements, comprising:
   providing a first mold having a plurality of recesses;
   applying a first polymer liquid in said plurality of recesses;
   providing a first contact shaping substrate;
   contacting said first contact shaping substrate with said first polymer liquid in said plurality of recesses, wherein said contact between said first contact shaping substrate and said first polymer liquid results in a deformation of the contour configuration of said first polymer liquid facing away from said plurality of recesses;

curing said first polymer liquid to form an array of optical lens elements;

further comprising, after providing a second polymer liquid onto said array of optical lens elements:
a step of providing a second contact shaping substrate;
a step of contacting said second contact shaping substrate with said second polymer liquid, wherein said contact between said second contact shaping substrate and said second polymer liquid results in a complete coverage of the contour configuration of said array of optical lens elements facing away from said first mold having a plurality of recesses;
curing said second polymer liquid; and
wherein said second contact shaping substrate is provided with a flow stop pattern acting as a flow stop for said second polymer liquid upon contacting said second contact shaping substrate with said second polymer liquid.

10. A method of fabricating an array of optical lens elements, comprising:
providing a first mold having a plurality of recesses;
applying a first polymer liquid in said plurality of recesses;
providing a first contact shaping substrate;
contacting said first contact shaping substrate with said first polymer liquid in said plurality of recesses, wherein said contact between said first contact shaping substrate and said first polymer liquid results in a deformation of the contour configuration of said first polymer liquid facing away from said plurality of recesses;
curing said first polymer liquid to form an array of optical lens elements;
further comprising, after curing said first polymer liquid:
a step of removing said first contact shaping substrate from said array of optical lens elements;
a step of providing a second polymer liquid onto said an array of optical lens elements;
a step of providing a second contact shaping substrate;
a step of contacting said second contact shaping substrate with said second polymer liquid, wherein said contact between said second contact shaping substrate and said second polymer liquid results in a complete coverage of the contour configuration of said array of optical lens elements facing away from said first mold having a plurality of recesses;
curing said second polymer liquid; and
wherein the surface energy of the contact surface of said second contact shaping substrate is such that said complete coverage of the contour configuration results in a lateral curvature shape.

11. A method of fabricating an array of optical lens elements according to claim 10, wherein said lateral curvature shape is a half moon shape.

12. A method of fabricating an array of optical lens elements according to claim 10, wherein said lateral curvature shape is a bell clock curve shape.

13. A method of fabricating an array of optical lens elements, comprising:
providing a first mold having a plurality of recesses;
applying a first polymer liquid in said plurality of recesses;
providing a first contact shaping substrate;
contacting said first contact shaping substrate with said first polymer liquid in said plurality of recesses, wherein said contact between said first contact shaping substrate and said first polymer liquid results in a deformation of the contour configuration of said first polymer liquid facing away from said plurality of recesses;
curing said first polymer liquid to form an array of optical lens elements;
further comprising, after curing said first polymer liquid,
a step of removing said first contact shaping substrate from said array of optical lens elements;
a step of providing a second polymer liquid onto said an array of optical lens elements;
further comprising, after providing said second polymer liquid onto said array of optical lens elements:
a step of providing a second contact shaping substrate;
a step of contacting said second contact shaping substrate with said second polymer liquid, wherein said contact between said second contact shaping substrate and said second polymer liquid results in a complete coverage of the contour configuration of said array of optical lens elements facing away from said first mold having a plurality of recesses;
curing said second polymer liquid;
wherein first contact shaping substrate is configured as a flat substrate; and
wherein said first contact shaping substrate is provided with a flow stop pattern acting as a flow stop for said first polymer liquid upon contacting said first contact shaping substrate with said first polymer liquid.

14. A method of fabricating an array of optical lens elements, comprising:
providing a first mold having a plurality of recesses;
applying a first polymer liquid in said plurality of recesses;
providing a first contact shaping substrate;
contacting said first contact shaping substrate with said first polymer liquid in said plurality of recesses, wherein said contact between said first contact shaping substrate and said first polymer liquid results in a deformation of the contour configuration of said first polymer liquid facing away from said plurality of recesses;
curing said first polymer liquid to form an array of optical lens elements;
further comprising, after curing said first polymer liquid,
a step of removing said first contact shaping substrate from said array of optical lens elements;
a step of providing a second polymer liquid onto said an array of optical lens elements;
curing said second polymer liquid;
further comprising, after providing said second polymer liquid onto said array of optical lens elements:
a step of providing a second contact shaping substrate;
a step of contacting said second contact shaping substrate with said second polymer liquid, wherein said contact between said second contact shaping substrate and said second polymer liquid results in a complete coverage of the contour configuration of said array of optical lens elements facing away from said first mold having a plurality of recesses;
curing said second polymer liquid; and
wherein said first contact shaping substrate is provided with a flow stop pattern acting as a flow stop for said first polymer liquid upon contacting said first contact shaping substrate with said first polymer liquid.

15. A method of fabricating an array of optical lens elements according to claim 14, wherein said second contact shaping substrate is provided with a flow stop pattern acting as a flow stop for said second polymer liquid upon contacting said second contact shaping substrate with said second polymer liquid.

* * * * *

UNITED STATES PATENT AND TRADEMARK OFFICE
CERTIFICATE OF CORRECTION

Page 1 of 1

PATENT NO. : 9,649,788 B2
APPLICATION NO. : 14/995812
DATED : May 16, 2017
INVENTOR(S) : Robertus Johannes Gerardus Coninx et al.

It is certified that error appears in the above-identified patent and that said Letters Patent is hereby corrected as shown below:

On the Title Page

Insert:
-- (30) Foreign Application Priority Data
August 21, 2015 (NL)................2015330 --

Signed and Sealed this
First Day of August, 2017

Joseph Matal
*Performing the Functions and Duties of the*
*Under Secretary of Commerce for Intellectual Property and*
*Director of the United States Patent and Trademark Office*